United States Patent
Song et al.

(10) Patent No.: US 7,997,783 B2
(45) Date of Patent: Aug. 16, 2011

(54) FRONT LIGHT UNIT WITH PRISMS STRUCTURE AND DISPLAY APPARATUS HAVING THE SAME

(75) Inventors: Hoon Song, Yongin-si (KR); Hong-seok Lee, Seongnam-si (KR); Jun-bo Yoon, Daejeon (KR); Joo-hyung Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 12/033,137

(22) Filed: Feb. 19, 2008

(65) Prior Publication Data

US 2009/0034295 A1  Feb. 5, 2009

(30) Foreign Application Priority Data

Aug. 3, 2007 (KR) .......... 10-2007-0078210

(51) Int. Cl.
*F21V 7/22* (2006.01)
*F21V 7/18* (2006.01)
*F21V 7/04* (2006.01)

(52) U.S. Cl. ........ 362/620; 362/629; 362/603; 362/559; 362/339

(58) Field of Classification Search .............. 362/603, 362/612, 615, 620, 626, 629, 559, 555, 339
See application file for complete search history.

(56) References Cited

U.S. PATENT DOCUMENTS

| | | | |
|---|---|---|---|
| 5,396,350 A * | 3/1995 | Beeson et al. | 362/600 |
| 6,011,602 A * | 1/2000 | Miyashita et al. | 362/620 |
| 6,129,439 A * | 10/2000 | Hou et al. | 362/620 |
| 6,247,826 B1 * | 6/2001 | Funamoto et al. | 362/603 |
| 7,001,060 B1 * | 2/2006 | Kimura | 362/620 |
| 7,188,989 B2 * | 3/2007 | Miyashita | 362/621 |
| 2003/0206408 A1 * | 11/2003 | Funamoto et al. | 362/620 |
| 2005/0232532 A1 * | 10/2005 | Wang et al. | 385/13 |
| 2005/0270798 A1 * | 12/2005 | Lee et al. | 362/607 |
| 2007/0058391 A1 * | 3/2007 | Wilson et al. | 362/620 |
| 2009/0091949 A1 * | 4/2009 | Lee et al. | 362/620 |

\* cited by examiner

*Primary Examiner* — Ismael Negron
(74) *Attorney, Agent, or Firm* — Sughrue Mion, PLLC

(57) ABSTRACT

The front light unit includes a light source and a light guide plate that guides light emitted from the light source. The light guide plate includes a rear surface through which the guided light is emitted and a front surface facing the rear surface, and a plurality of prism shape structures which are provided in one unit with the light guide plate and emits light totally reflected from the front surface of the light guide plate. The light guide plate and the prism shape structures are formed of a transparent elastic material.

10 Claims, 6 Drawing Sheets

FRONT LIGHT UNIT WITH PRISMS STRUCTURE AND DISPLAY APPARATUS HAVING THE SAME

CROSS-REFERENCE TO RELATED PATENT APPLICATION

This application claims the benefit of Korean Patent Application No. 10-2007-0078210, filed on Aug. 3, 2007, in the Korean Intellectual Property Office, the disclosure of which is incorporated herein in its entirety by reference.

BACKGROUND OF THE INVENTION

1. Field of the Invention

The present invention relates to a front light unit and a flat panel display apparatus including the same, and more particularly, to a bendable front light unit and a flat panel display apparatus including the same.

2. Description of the Related Art

Flat panel display apparatuses are generally classified into emissive display apparatuses that form an image using internally generated light and non-emissive display apparatuses that display an image using light generated by an external device. An example of a non-emissive display apparatus is a liquid crystal display (LCD) device. The non-emissive display apparatuses require an additional background light source.

There are three types of background light sources, that is, a reflection type, a transmission type, and a hybrid type combining the reflection type and the transmission type. A background light source of a transmission type is a backlight unit, and a background light source of a reflection type is a front light unit.

Most of the flat panel display apparatuses currently used are LCD devices. LCD devices are manufactured in various sizes; small sized LCDs are used as display windows of measuring instruments, display units of mobile phones, and monitors of notebook computers and desktop computers, and large sized LCS are used for TVs of 40 to 60 inches. Most of the LCD devices are of a transmission type, that is, light is supplied from a backlight unit placed in the backside of the panel and liquid crystals in the panel controls the polarized light, thereby forming an overall screen.

However, the transmission type LCD apparatus is unsuitable to use at outdoors. That is, the transmission type LCD apparatus has drawbacks in that a contrast ratio is reduced and a correct color cannot be displayed at the outdoors (in a bright environment).

To address the above problems, various reflection type display apparatuses have been studied. Reflection type display apparatuses that use ambient light, such as reflection type liquid crystal display devices, electrophresis displays, electrochromic displays, and dielectrophoresis displays have been studied. In particular, the reflection type liquid crystal display apparatus and electrophresis displays have been actively studied. Specifically, in the case of the electrophresis displays, E-Ink Corporation (one of the leading manufactures) supplies electrophresis display panels and products including such display panels, for example, e-books and HHPs.

Since the reflection type flat panel display apparatuses display images using external light, a backlight device is unnecessary, and thus, power consumption can be greatly reduced. Also, such apparatuses have a large screen and high portability since they can be rolled or folded.

However, since the reflection type flat panel display apparatuses display an image using external light, if there is no external light, that is, in a dark place, the reflection type flat panel display apparatuses cannot be used. Also, since the reflection type flat panel display apparatuses have a structure completely different from the conventional transmission type LCD devices, it is difficult to supply light to a panel using the backlight device. Also, since a conventional front light unit includes a plurality of film shape parts to supply light to a desired place and some hard parts, there are some limitations in bending the reflection panel display apparatuses.

SUMMARY OF THE INVENTION

To solve the above and/or other problems, the present invention provides a front light unit that includes an additional light source and thus can display an image without using external light and that can be freely bent by using an elastic material, and a flat panel display apparatus that includes the front light unit.

According to an aspect of the present invention, there is provided a front light unit comprising: a light source; a light guide plate that guides light emitted from the light source and comprises a rear surface through which the guided light is emitted and a front surface facing the rear surface; and a plurality of prism shape structures which are provided in one unit with the light guide plate and emits light totally reflected from the front surface of the light guide plate, wherein the light guide plate and the prism shape structures are formed of a transparent elastic material.

According to another aspect of the present invention, there is provided a flat panel display apparatus comprising: a front light unit comprising a light source; a light guide plate that guides light emitted from the light source and comprises a rear surface through which the guided light is emitted and a front surface facing the rear surface; and a plurality of prism shape structures which are provided in one unit with the light guide plate and emits light totally reflected from the front surface of the light guide plate; and an image forming panel that is provided on a lower side of the front light unit to form an image using light emitted from the front light unit and is formed of an elastic material, wherein the prism shape structures are formed in one unit with the light guide plate, and the light guide plate and the prism shape structures are formed of a transparent elastic material.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
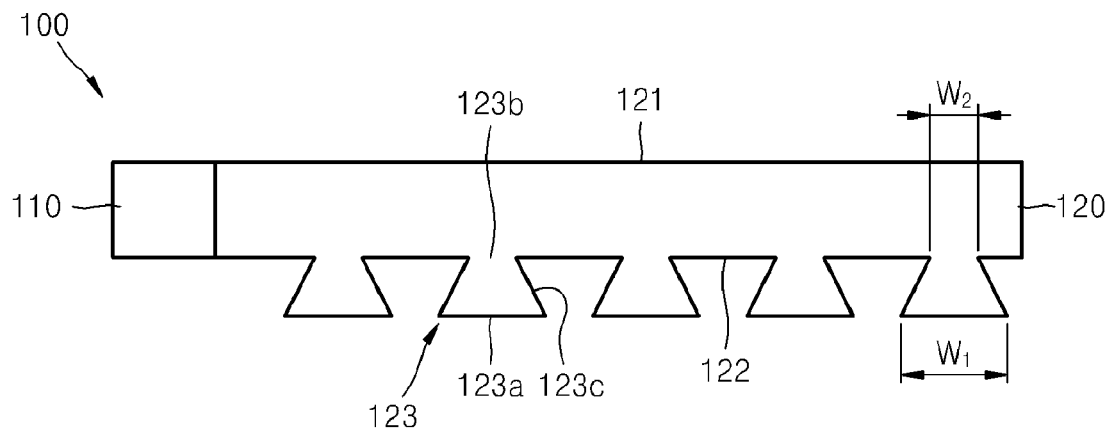
FIG. 1 is a schematic side view of a front light unit according to an embodiment of the present invention.

The present invention will now be described more fully with reference to the accompanying drawings in which exemplary embodiments of the invention are shown. In the drawings, the thicknesses of layers and regions are exaggerated for clarity, and like reference numerals refer to like elements.

Figure 2:
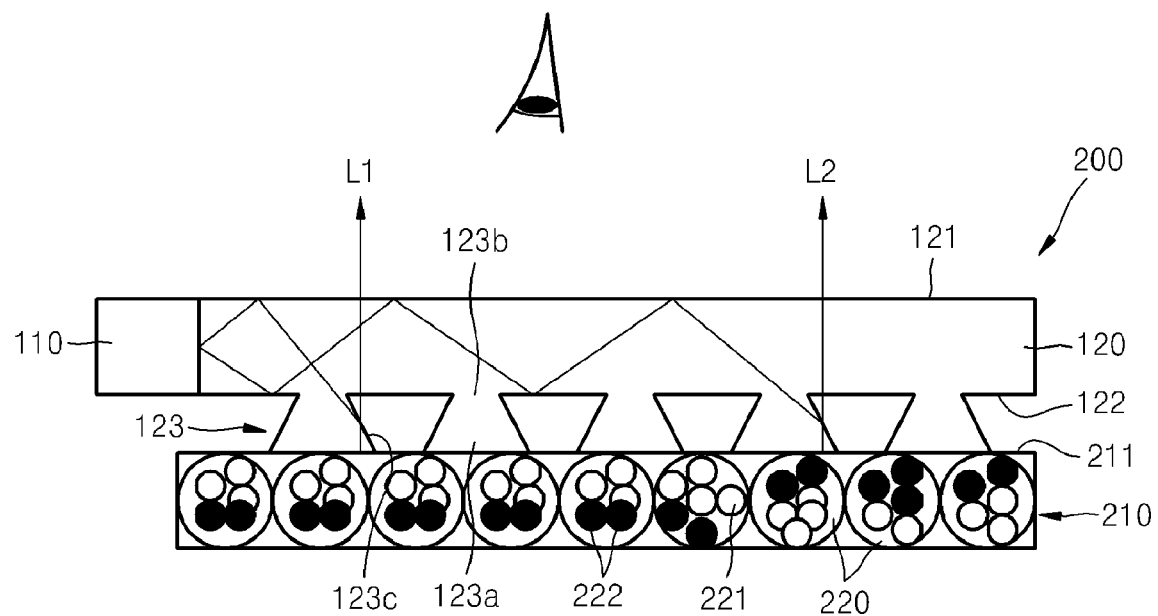
FIG. 2 is a side view of a flat panel display apparatus including the front light unit of FIG. 1, according to an embodiment of the present invention.
Figure 3:
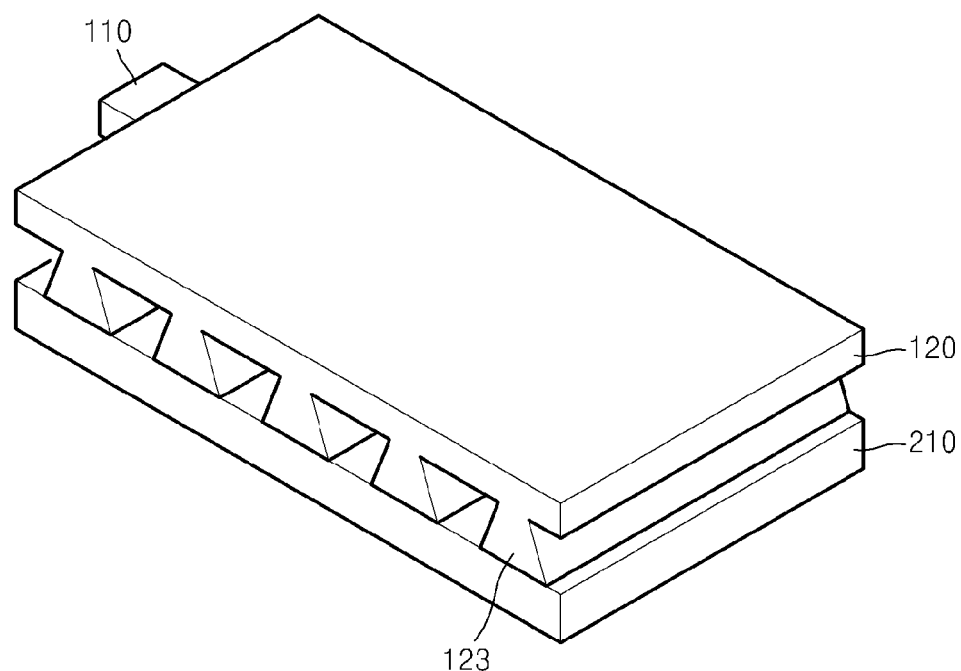
FIG. 3 is a perspective view of the flat panel display apparatus of FIG. 2, according to an embodiment of the present invention.
Figure 5:
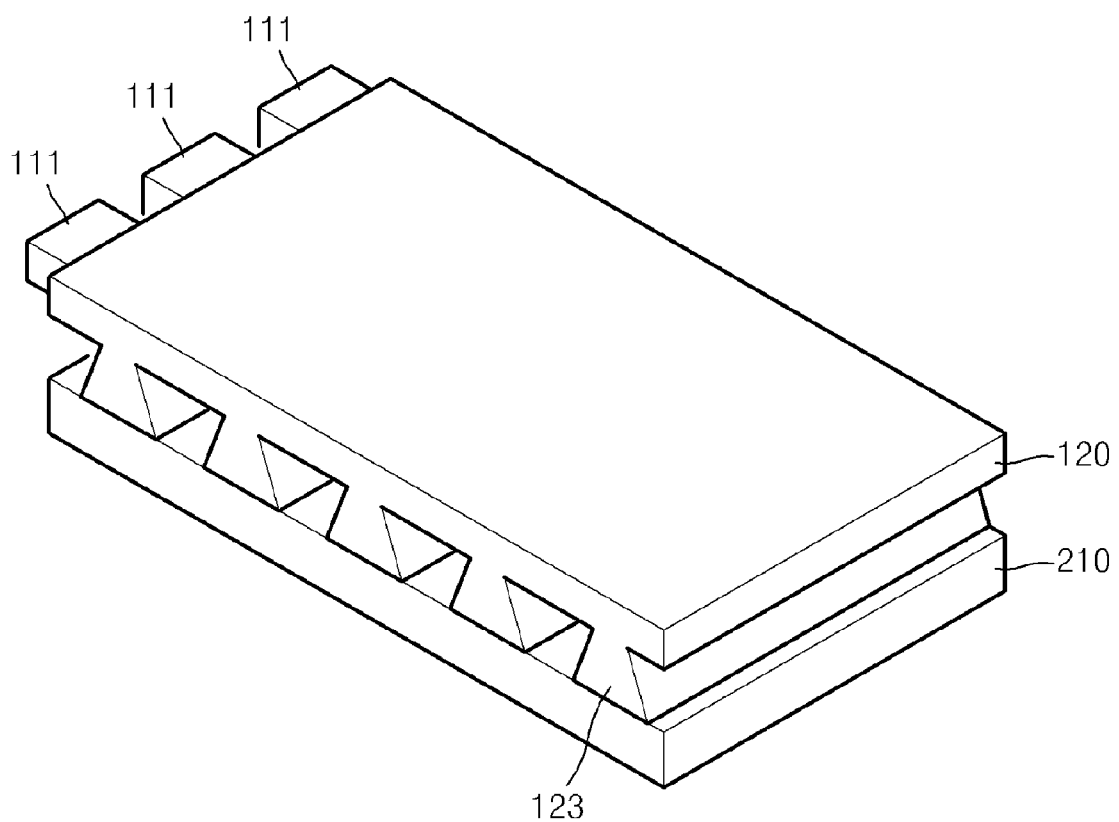
FIG. 5 is a perspective view of a flat panel display apparatus according to another embodiment of the present invention.

FIG. 1 is a schematic side view of a front light unit 100 according to an embodiment of the present invention. FIG. 2 is a side view of a flat panel display apparatus including the front light unit of FIG. 1, according to an embodiment of the present invention, FIG. 3 is a perspective view of the flat panel display apparatus of FIG. 2, according to an embodiment of the present invention, and FIG. 5 is a perspective view of a flat panel display apparatus according to another embodiment of the present invention.

Referring to FIG. 1, the front light unit 100 includes a light source 110, a light guide plate 120 that transforms light emitted from the light source 1 1 0 into a surface light, and a plurality of prism shape structures 123 formed in one unit with the rear of the light guide plate 120.

The light source 110 is disposed on a side of the light guide plate 120 to supply light to the light guide plate 120, and can be a light emitting diode (LED) or a cold cathode fluorescent lamp (CCFL). The light source 110 is a point light source, and, as depicted in FIG. 3, one light source 110 can be disposed on a side of the light guide plate 120, or, as depicted in FIG. 5, a plurality of light sources 110 can be disposed a predetermined distance apart from each other on a side of the light guide plate 120. Although not shown, line light sources can be disposed along a side of the light guide plate 120.

FIGS. 8 through 11 are perspective views of flat panel display apparatuses in which light sources 112 are disposed on corners of light guide plates.

Figure 8:
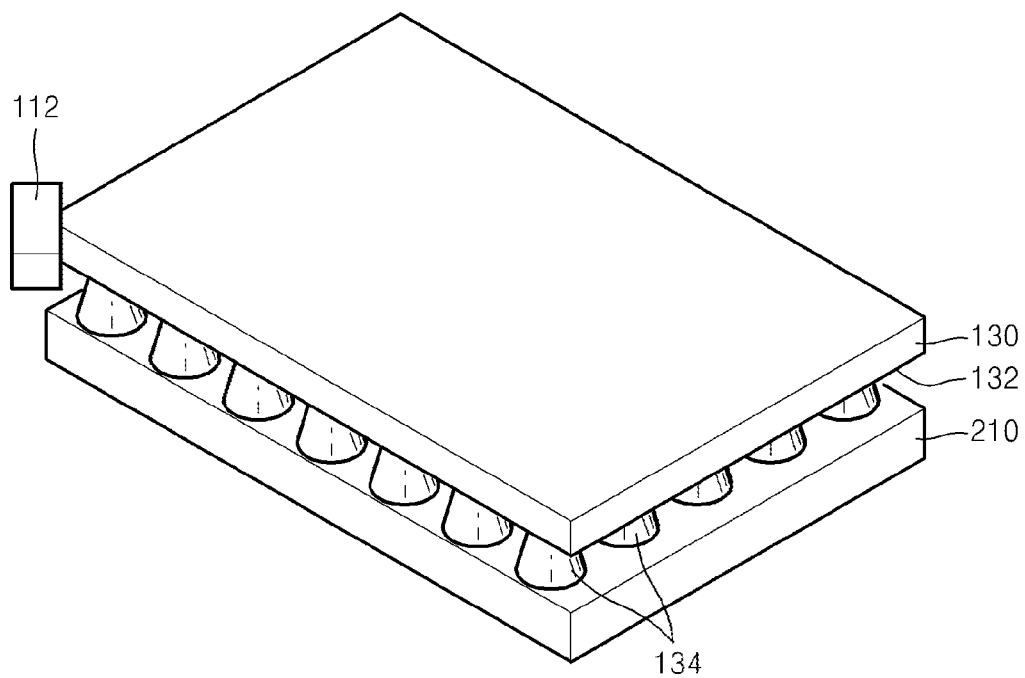
FIGS. 8 through 11 are perspective views of flat panel display apparatuses in which light sources are disposed on corners of light guide plates.
Figure 9:
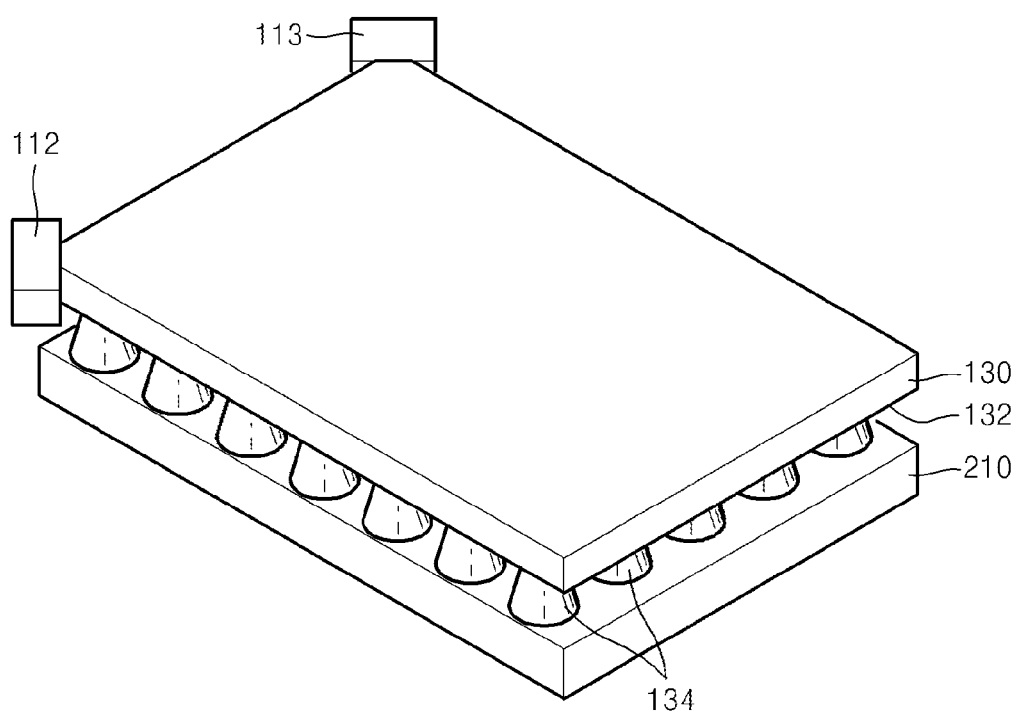
Figure 10:
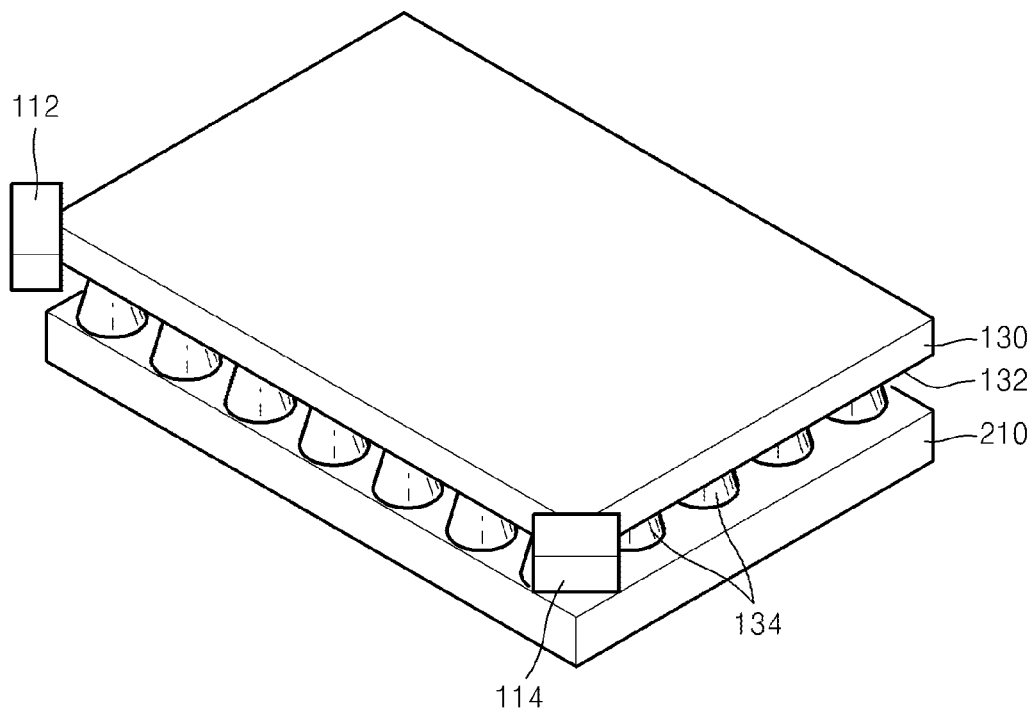
Figure 11:
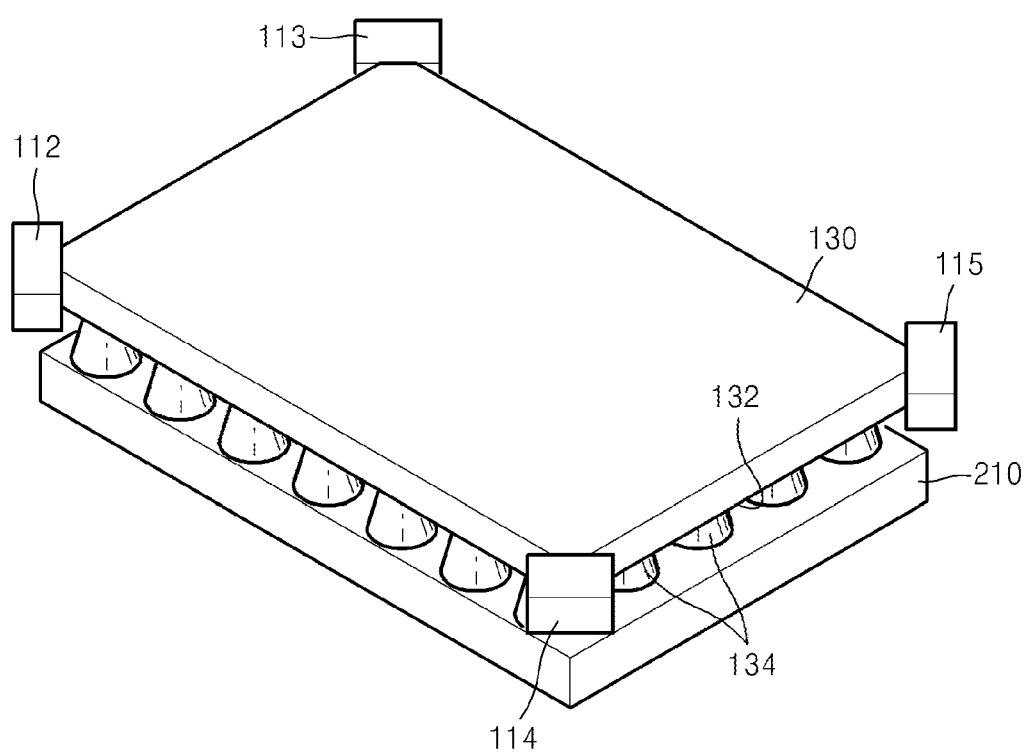

The light source 112 is a point light source. As depicted in FIG. 8, the light source 112 can be disposed on a corner of the light guide plate 130, or, as depicted in FIG. 9, the light sources 112 and 113 can be disposed on corners facing each other along a side of the light guide plate 130. Also, as depicted in FIG. 10, the light sources 112 and 114 can be disposed on corners facing each other along a lengthwise direction of the light guide plate 130, or, as depicted in FIG. 11, the light sources 112, 113, 114, and 115 can be disposed on each corner of the light guide plate 130.

Also, although not shown, line light sources can be disposed along the sides of the light guide plate 120.

The light guide plate 120 guides light emitted from the light source 110 to illuminate a surface of an image forming panel 210 (refer to FIG. 2), and is formed in a plate shape having a rear surface 122 through which guided light exists and a front surface 121 facing the rear surface 122.

The prism shape structures 123 allow the light guided by the light guide plate 120 to be emitted, and are disposed a predetermined distance apart from each other on the rear surface 122 of the light guide plate 120. As depicted in FIGS. 3 and 5, each of the prism shape structures 123 extends along the side of the light guide plate 120.

A cross-section in a lengthwise direction of each of the prism shape structures 123 has a trapezoidal shape. Thus, the width W1 of the upper surface 123a of the prism shape structure 123 is greater than the width W2 of the lower surface 123b. The prism shape structures 123 are formed at the same time as the light guide plate 120 since the prism shape structures 123 are formed in one unit with the light guide plate 120.

Figure 6:
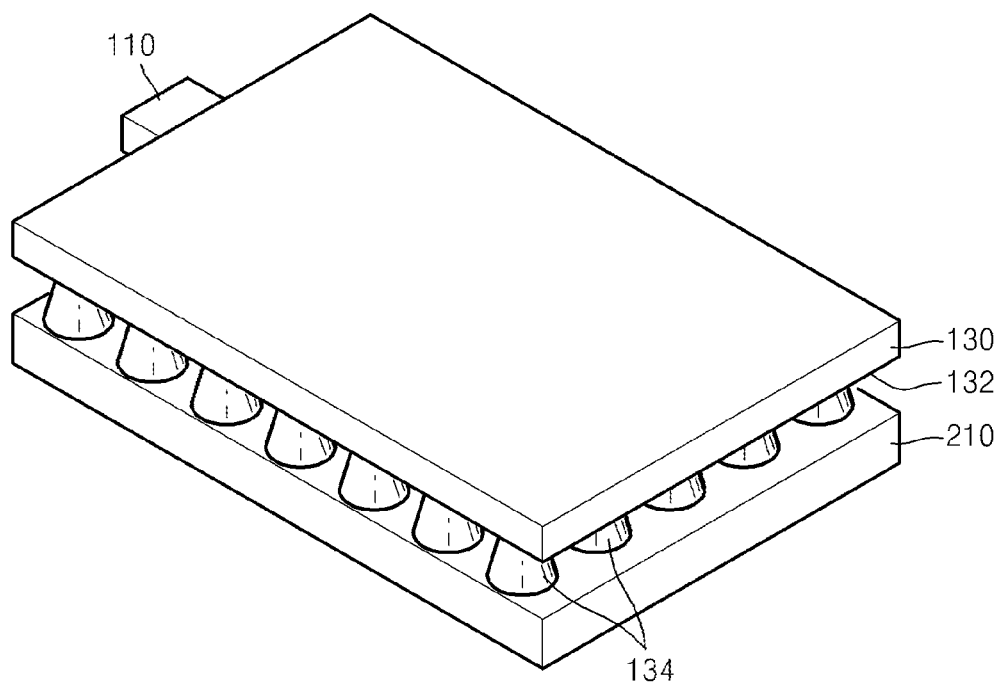
FIG. 6 is a perspective view of the flat panel display apparatus of FIG. 3 including prism shape structures according to another embodiment of the present invention.
Figure 7:
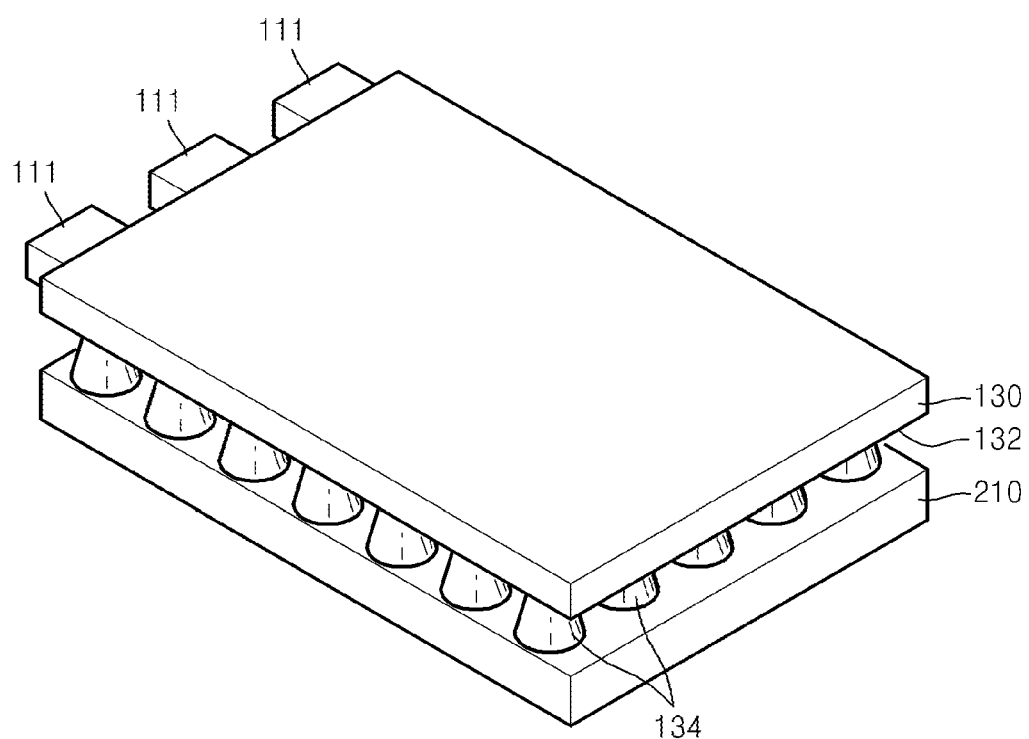
FIG. 7 is a perspective view of the flat panel display apparatus of FIG. 5 including prism shape structures according to another embodiment of the present invention.

FIGS. 6 and 7 show flat panel display apparatuses including prism shape structures according to another embodiment of the present invention.

FIG. 6 is a perspective view of the flat panel display apparatus of FIG. 3 including prism shape structures according to another embodiment of the present invention, and FIG. 7 is a perspective view of the flat panel display apparatus of FIG. 5 including prism shape structures according to another embodiment of the present invention.

Referring to FIG. 6, the flat panel display apparatus of FIG. 6 has an overall configuration similar to that of FIG. 3. However, in the flat panel display apparatus of FIG. 6, the prism shape structures 124 134 have a cone shape, and are disposed a predetermined distance apart from each other on the rear surface 122 132 of the light guide plate 4-20-130 in a lengthwise direction and with respect to sides of the light guide plate 120130.

Referring to FIG. 7, the flat panel display apparatus of FIG. 7 has an overall configuration similar to that of FIG. 5. However, in the flat panel display apparatus of FIG. 7, the prism shape structures 134 have a cone shape, and are disposed a predetermined distance apart from each other on the rear surface 132 of the light guide plate 130 in a lengthwise direction and with respect to sides of the light guide plate 130.

Also, although not shown, the prism shape structures 134 can have various shapes such as a rectangular shape, a circle, or an oval shape.

The light guide plate 130 and the prism shape structures 134 may be formed of a transparent elastic material. Thus, the light guide plate 130 and the prism shape structures 134 can be freely bent and rolled. For example, the light guide plate 130 and the prism shape structures 134 may be formed of polydimethylsiloxane (PDMS).

Referring to FIG. 2, a flat panel display apparatus 200 includes a front light unit 100 and the image forming panel 210. The image forming panel 210 is formed on a lower side of the front light unit 100 and forms an image using light from the front light unit 100 or external light.

The image forming panel 210 displays an image and in the present embodiment is a paper like display (PLD) panel. The image forming panel 210 is disposed such that an upper surface 211 thereof can contact upper surfaces 123a of the prism shape structures 123. Although not shown, the image forming panel 210 can be attached to the prism shape structures 123 using an adhesive.

Since the image forming panel 210 is thin and is formed of an elastic material, the image forming panel 210 can be easily bent and rolled into a cylinder shape.

Since both the light guide plate 120 and the image forming panel 210 are formed of an elastic material, the flat panel display apparatus 200 can be easily carried after bending or rolling it into a cylinder shape. Afterwards, in order to use the flat panel display apparatus 200, the flat panel display apparatus 200 can be reversed to the flat shape.

In the PLD panel, in order to form an image, desired color particles are disposed close to the upper surface 211 of the image forming panel 210, that is, the prism shape structures 123 by arranging positions of a plurality of charged color particles using electromotive force so that the particles exhibit the desired colors upon being illuminated with light entering from the outside.

As shown in FIG. 2, the image forming panel 210 includes a plurality of reflection regions 220 containing a material in a liquid phase a plurality of white particles 221 and black particles 222. In the present embodiment, in the left side of the image forming panel 210, three white particle particles 221 are disposed in the reflection regions 220 close to the upper surface 211 of the image forming panel 210, and thus, the three white particles 221 exhibit white color when light L1 entering through the prism shape structures 123 is reflected at the upper surface 211 of the image forming panel 210. In the right side of the image forming panel 210, three black particles 222 are disposed close to the upper surface 211 of the image forming panel 210, and thus, the three black particles 222 exhibit black color when light L2 entering through the prism shape structures 123 is reflected at the upper surface 211 of the image forming panel 210.

In the present embodiment, although it has been described that the image forming panel 210 is a PLD panel, the image forming panel 210 according to the present invention is not limited thereto. That is, any image forming panel that reflects light entering from the outside and is formed of an elastic material can be used. For example, an electric paper display (EPD), or a display that uses a plastic LCD, a cholesteric LC, or electrowetting and is formed on a plastic substrate can be used.

An operation of a flat panel display apparatus having the above configuration according to the present invention will now be described with reference to the accompanied drawings.

Light emitted from the light source 110 is totally reflected and advances in the light guide plate 120, and exits through the prism shape structures 123. Light entering the prism shape structures 123 enters the upper surface 211 of the image forming panel 210 by satisfying a total reflection condition at side surfaces 123c. The light is reflected by the upper surface 211 of the image forming panel 210, and, at this point, as described above, the light exhibits a desired color. The light reflected by the upper surface 211 of the image forming panel 210 is emitted without being totally reflecting although the light passes through the prism shape structures 123 and the light guide plate 120 since the light does not meet the total reflection condition.

FIG. 2 shows a method of forming an image using a light source 110 when there is no external light. However, if there is external light, an image can be formed using the external light, and thus, the light source 110 is not used.

Figure 4:
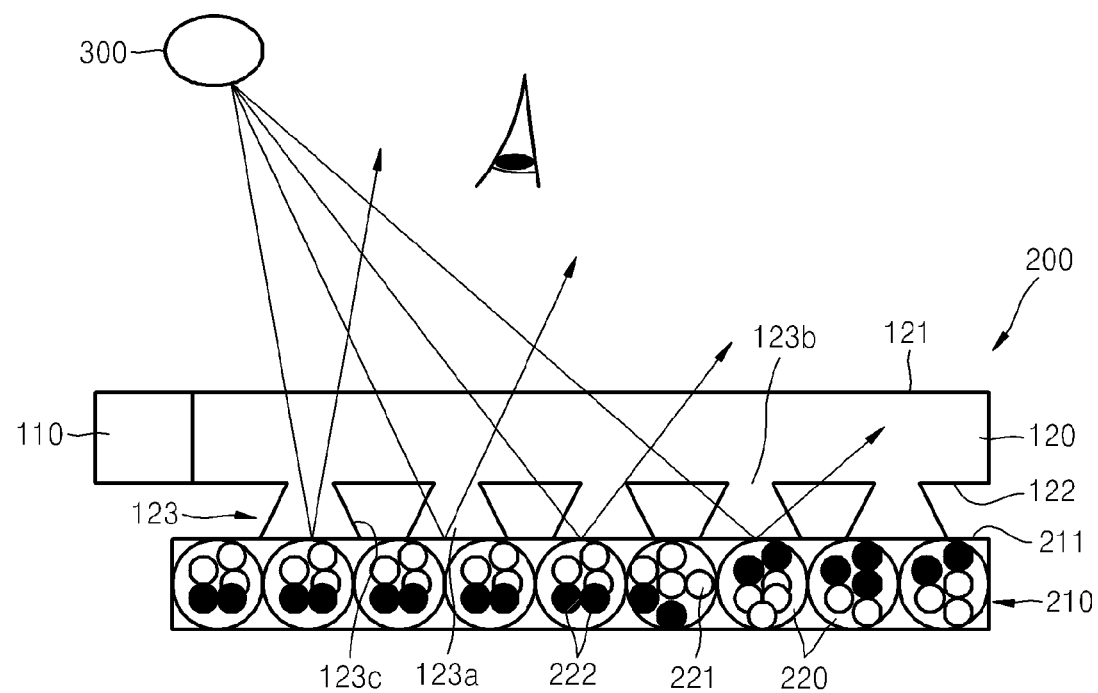
FIG. 4 is a side view of the flat panel display apparatus of FIG. 2 showing image formation using external light.

FIG. 4 is a side view of the flat panel display apparatus of FIG. 2 showing image formation using external light.

Referring to FIG. 4, light emitted from an external light source 300 passes through the light guide plate 120 and the prism shape structures 123 and is reflected at the upper surface 211 of the image forming panel 210 since the majority of the light does not meet the total reflection condition when the light passes through the light guide plate 120 and the prism shape structures 123. The light reflected at the upper surface 211 of the image forming panel 210 re-passes and advances through the prism shape structures 123 and the light guide plate 120, and is thus emitted.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A front light unit comprising:
    a light source;
    a light guide plate that guides light emitted from the light source and comprises a rear surface through which the guided light is emitted and a front surface facing the rear surface; and
    a plurality of prism shape structures integrally formed with the light guide plate as a monolithic structure and which emits light totally reflected from the front surface of the light guide plate, wherein the light guide plate and the prism shape structures are formed of a transparent, freely bendable, elastic material, and wherein the elastic material is freely bendable to an extent the light guide plate can be rolled in a cylinder shape.

2. The front light unit of claim 1, wherein the light guide plate and the prism shape structures are formed of a PDMS material.

3. The front light unit of claim 1, wherein each of the prism shape structures comprises a lower surface connected to the rear surface of the light guide plate and an upper surface through which light is emitted, and the upper surface has a width greater than that of the lower surface.

4. The front light unit of claim 3, wherein a vertical cross-section of the prism shape structures has a trapezoidal shape.

5. A flat panel display apparatus comprising:
    a front light unit that comprises: a light source; a light guide plate that guides light emitted from the light source and comprises a rear surface through which the guided light is emitted and a front surface facing the rear surface; and a plurality of prism shape structures which are provided in one unit with the light guide plate and emits light totally reflected from the front surface of the light guide plate; and
    an image forming panel that is provided on a lower side of the front light unit to form an image using light emitted from the front light unit and is formed of an elastic material , wherein the prism shape structures are integrally formed with the light guide plate as a monolithic structure, and the light guide plate and the prism shape structures are formed of a transparent, freely bendable, elastic material, and wherein the elastic material is freely bendable to an extent the light guide plate can be rolled in a cylinder shape.

6. The flat panel display apparatus of claim 5, wherein the light guide plate and the prism shape structures are formed of a PDMS material.

7. The flat panel display apparatus of claim 5, wherein the front light unit can be bent to an extent greater than the image forming panel and can be rolled in a cylinder shape.

8. The flat panel display apparatus of claim 5, wherein each of the prism shape structures comprises a lower surface connected to the rear surface of the light guide plate and an upper surface through which light is emitted, and the upper surface has a width greater than that of the lower surface.

9. The flat panel display apparatus of claim 5, wherein a vertical cross-section of the prism shape structures has a trapezoidal shape.

10. The flat panel display apparatus of claim 5, wherein the image forming panel is installed to contact the upper surfaces of the prism shape structures.

* * * * *